United States Patent [19]

Kukes et al.

[11] Patent Number: 4,565,800

[45] Date of Patent: Jan. 21, 1986

[54] HYDROFINING CATALYSTS

[75] Inventors: Simon G. Kukes; Stephen L. Parrott; Karlheinz K. Brandes, all of Bartlesville, Okla.

[73] Assignee: Philips Petroleum Company, Bartlesville, Okla.

[21] Appl. No.: 748,110

[22] Filed: Jun. 24, 1985

[51] Int. Cl.$^4$ .............................................. B01J 23/22
[52] U.S. Cl. ................... 502/200; 208/217; 208/251 H; 502/216; 502/337; 502/353
[58] Field of Search ............... 502/200, 216, 353, 337

[56] References Cited

U.S. PATENT DOCUMENTS

| | | | |
|---|---|---|---|
| 3,262,874 | 7/1966 | Gatsis | 208/216 |
| 3,673,079 | 6/1972 | Mulaskey et al. | 208/111 |
| 3,825,504 | 7/1974 | Hilfman | 252/464 |
| 3,849,087 | 11/1974 | Arkawa et al. | 48/214 |
| 4,115,248 | 9/1978 | Mulaskey | 208/112 |
| 4,166,026 | 8/1979 | Fukui et al. | 208/210 |
| 4,233,184 | 11/1980 | Cull | 252/437 |
| 4,340,466 | 7/1982 | Inooka | 208/210 |
| 4,362,653 | 12/1982 | Robinson | 252/455 R |
| 4,382,877 | 5/1983 | Kehl | 252/437 |
| 4,422,959 | 12/1983 | Lawson et al. | 502/247 |
| 4,422,960 | 12/1983 | Shiroto et al. | 502/206 |
| 4,440,631 | 4/1984 | Toyari et al. | 208/112 |
| 4,513,097 | 4/1985 | Angmorter et al. | 502/211 |

FOREIGN PATENT DOCUMENTS 0977003  11/1982  U.S.S.R. .............................. 502/200

*Primary Examiner*—John Doll
*Assistant Examiner*—A. Pal
*Attorney, Agent, or Firm*—K. K. Brandes

[57] ABSTRACT

A catalyst composition is prepared by dissolving a suitable vanadium and oxygen containing compound, a suitable nickel (II) compound and ammonia in water, mixing this solution with an alumina containing support material, and calcining this mixture. This catalyst composition is used primarily for hydrotreating of hydrocarbon feed stream, which contain nickel, vanadium and sulfur impurities, particularly heavy oils.

14 Claims, No Drawings

HYDROFINING CATALYSTS

BACKGROUND OF THE INVENTION

In one aspect, this invention relates to a process for preparing a promoted, alumina-based catalyst composition. In another aspect, this invention relates to catalytic hydrotreating of liquid hydrocarbon containing feed streams, in particular heavy oils.

The use of alumina, promoted with transition metals or compounds thereof, for hydrotreating (e.g., demetallizing, desulfurizing, hydrocracking) liquid hydrocarbon feed streams, which contain coke precursors and metal, sulfur, and nitrogen impurities, such as heavy petroleum oils and fractions thereof is well known. However, there is an ever present need to develop new methods of preparing such catalysts and to develop new catalysts that are more effective in removing undesirable impurities from such feed streams.

SUMMARY OF THE INVENTION

It is an object of this invention to provide an effective hydrofining catalyst composition. It is another object of this invention to provide a process for preparing a new catalyst composition. It is still another object of this invention to provide a new impregnating solution, to be used primarily for preparing catalyst compositions. It is a further object of this invention to employ a new and effective catalyst for the removal of impurities from heavy hydrocarbon containing oils. Other objects and advantages will be apparent from the detailed description and the appended claims.

In accordance with this invention, a composition of matter (suitable as a catalyst composition) containing vanadium, nickel and alumina is prepared by a process comprising the steps of:
(A) mixing (a) at least one vanadium and oxygen containing compound (b), at least one nickel(II) compound, (c) ammonia and (d) water, in such amounts and under such conditions as to obtain a solution;
(B) mixing said solution obtained in step (A) with an alumina-containing support material;
(C) heating the mixture obtained in step (B) at a first temperature under such conditions as to at least partially dry said mixture; and
(D) heating (calcining) the at least partially dried mixture obtained in step (C) at a second temperature, which is higher than said first temperature, under such conditions as to activate said mixture.

In one embodiment, the process of this invention comprises a presulfiding step (F) after step (D).

In another embodiment of this invention, an aqueous solution as prepared by step (A) is provided. This solution is preferably used for impregnating substantially inert support materials so as to prepare catalyst compositions.

In still another embodiment of this invention, the catalyst composition prepared by the process of this invention comprising steps (A), (B), (C) and (D) is used for contacting with a free hydrogen containing gas and a hydrocarbon containing feed stream, which also contains compounds of sulfur, nickel and vanadium, under such conditions as to produce a hydrocarbon containing stream having reduced levels of sulfur, nickel and vanadium.

DETAILED DESCRIPTION OF THE INVENTION

Preferably the vanadium compound and oxygen containing compound (a) used in step (A) of the process of this invention is selected from the group consisting of ammonium and alkali metal orthovanadates, ammonium and alkali metal pyrovanadates, ammonium and alkali metal metavanadates, divanadium pentoxide and hydrated forms thereof, vanadium dioxide and hydrated forms thereof, divanadium trioxide and hydrated forms thereof.

Preferably the nickel (II) compound (i.e., divalent nickel compound) (b) used in step (B) of the process of this invention is selected from the group consisting of nickel carbonate, nickel bicarbonate, basic nickel carbonate ($Ni_2(OH)_2(CO_3)$), nickel nitrate, nickel sulfate, nickel halides, nickel acetate, nickel formate, nickel oxalate, nickel carboxylates containing from 3-12 carbon atoms, nickel oxide and nickel hydroxide.

It is presently preferred to carry out step (A) under such conditions and using such amounts of (a), (b), (c) and (d) as to obtain a substantially clear solution. It is believed that this solution comprises complex cations that contains divalent nickel (i.e., $Ni^{+2}$) and ammonia, and anions that contain vanadium and oxygen. However, it is within the scope of this invention to obtain in step (A) a solution having solid particles dispersed therein. In this case, the solution plus dispersed solids can be used as is in step (B), or preferably, the dispersed solid particles are separated from the solution by any suitable separation means such as filtration, centrifugation or settling and subsequent draining before step (B).

In a presently most preferred embodiment, the vanadium compound is $NH_4VO_3$, the nickel compound is $NiCO_3$, and ammonia is added as a concentrated aqueous solution containing about 5-10 mole/l $NH_3$. The solution obtained in step (A) preferably contains the following concentrations of V and Ni, given as the number of gram-atomic weights (herein referred to as mole) per liter solution, and of $NH_3$, given as the number of gram-molecular weights (herein also referred to as mole) per liter solution:

|  | Broad | Intermediate | Narrow |
| --- | --- | --- | --- |
| Mole/l of V | 0.005–4.0 | 0.01–1.5 | 0.03–0.5 |
| Mole/l of Ni | 0.005–4.0 | 0.01–1.5 | 0.03–0.5 |
| Mole/l of $NH_3$ | 0.03–10 | 0.1–6 | 0.3–2 |

In one embodiment of this invention, the solution obtained in step (A) is provided and used as is for purposes other than making alumina-supported catalysts. For instance, the solution can be used for impregnating substantially inert support materials such as silica, alumino-silicates (e.g., zeolites), titania, metal phosphates and the like, so as to make a variety of catalysts, preferably for hydrogenation and hydrocracking reactions. However, it is within the scope of this invention to use this solution for purposes other than catalyst preparation. Solid particles dispersed in the solution can be removed by the above-described separation means.

The alumina-containing support material employed in step (B) can be substantially pure alumina or partially hydrated forms thereof. Preferably the alumina-containing support material is a finely divided solid. Generally the surface area (determined by BET/$N_2$; ASTM D3037) of the alumina-containing material ranges from about 20 m²/g to about 350 m²/g. The support material may contain transition metals (e.g., Mo, Ni) or compounds thereof, usually at a level of less than 1 weight-% metals, based on the weight of the entire alumina-containing support material (before impregnation step (A)). It is within the scope of this invention to employ mixtures of alumina and other inorganic refractory materials such as silica, silica-alumina, alumino-silicates, magnesia, titania, zirconia, aluminum phosphate, zirconium phosphate and the like. If a phosphate is present, the amount is generally less than 10 weight-% P, based on the weight of the alumina-containing support material (before impregnation).

The drying step (C) is generally carried out in air or an inert gas, at a temperature ranging from about 25° C. to about 200° C. (preferably 50°–100° C.) so as to remove the greatest portion of water from the mixture obtained in step (B). Vacuum conditions may be employed but are presently not preferred. The at least partially dried mixture generally contains less that about 20 weight-% water. The rate of drying is controlled so as to avoid surges of water vapor that can cause the impregnating solution to splatter and to excessively accumulate in certain surface regions of the solid support material. Depending on the drying temperature and specific drying conditions (such as extent of air movement, thickness of the solid layer to be dried), the drying time ranges generally from about 0.5 hour to about 100 hours, preferably from about 1 hour to about 30 hours.

It is presently believed that the activation occurring in calcining step (D) is the result of an at least partial conversion of the nickel and vanadium compounds of step (A) to oxidic compounds of Ni and V. The terms "activate" and "activation" as used herein mean that the calcined catalyst composition of this invention is a more effective catalyst for hydrotreating reactions, particularly hydrodemetallization and hydrodesulfurization of liquid hydrocarbon containing feed streams, than the at least partially dried mixture obtained in step (C). Preferred heating calcining conditions in step (D) comprise heating (generally in a non-reducing gas atmosphere) a temperature ranging from about 200° C. to about 600° C. (more preferably 300°–600° C.), and a heating time ranging from 0.5 to about 10 hours. A presently more preferred specific calcining program is described in Example I. Generally the heating is carried out in a free oxygen containing gas, preferably air. But other gases, e.g., hydrogen, nitrogen, helium, neon, argon, krypton, xenon, hydrogen sulfide or mixtures thereof may also be employed.

The thus calcined catalyst composition of this invention generally comprises from about 0.1 to about 5.0, preferably from about 0.5 to about 2.0, weight-% V, based on the weight of the entire catalyst composition; and from about 0.1 to about 5.0, preferably from about 0.5 to about 2.0, weight-% Ni, based on the weight of the entire catalyst composition. The surface area (determined by the BET/$N_2$ method; ASTM D3037) of the calcined catalyst composition of this invention ranges from about 20 to about 350 m²/g, preferably from about 100 to about 250 m²/g. The catalyst composition can be pelletized or compacted into various shapes (e.g., spherical cylindrical or trilobal) for convenient shipping and use in fixed catalyst beds.

In one embodiment, the calcined catalyst composition of this invention is presulfided by the additional step (F) of contacting the calcined catalyst composition with a suitable sulfur compound under such conditions as to at least partially convert the transition metal compounds contained in the calcined catalyst composition to sulfides. This can be accomplished by passing a sulfur-containing gas oil or a solution of COS or mercaptans or organic sulfides, e.g., in a hydrocarbon solvent, over the catalyst composition at an elevated temperature (e.g., at 300°–650° F.), generally in the presence of hydrogen gas. Or a gaseous mixture of hydrogen and hydrogen sulfide (e.g. at a volume ratio of about 10:1) can be passed over the catalyst composition at an elevated temperature, preferably 1–15 hours at about 400° F. and then 1–15 hours at about 700° F. This presulfiding step is particularly desirable when the catalyst composition of this invention is used for hydrotreating or hydrocracking of liquid hydrocarbon containing feed streams.

The composition of matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon containing feed streams, which also contain compounds of sulfur, nickel and vanadium as impurities, and generally also asphaltenes, coke precursors (measured as Ramsbottom carbon residue) and nitrogen compounds. Suitable hydrocarbon containing feed streams include crude oil and fractions thereof, petroleum products, heavy oil extracts, coal pyrolyzates, liquefied coal products, products from tar sands, shale oil and shale oil products. The catalyst composition of this invention is particularly suited for treating heavy topped crudes and heavy oil residua, which generally have an initial boiling point in excess of about 400° F., preferably in excess of about 600° F., containing about 10–1000 ppmw (parts per million by weight) of vanadium, about 5–500 ppmw of nickel, about 0.5–5 weight-% of sulfur, about 0.2–2 weight-% of nitrogen, and having an API$^{60}$ gravity of about 5–25.

The hydrotreating process employing the catalyst composition of this invention is carried out in any suitable apparatus whereby an intimate contact of the catalyst composition with said hydrocarbon containing feed stream and a free hydrogen containing gas is achieved, under such conditions as to produce a hydrocarbon containing stream having reduced levels of nickel, vanadium and sulfur. Generally, lower levels of nitrogen and Ramsbottom carbon residue and a higher value of API$^{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrocarbon hydrotreating process can be carried out as a batch process or, preferably, as a continuous process.

The catalyst composition of this invention can be used in said hydrotreating process alone in a reactor or can be used in combination with essentially inert materials such as alumina, silica, titania, magnesia, silicates, metal aluminates, alumino-silicates (e.g., zeolites), titania and metal phosphates. Alternating layers of the inert material and of the catalyst composition can be used, or the catalyst composition can be mixed with the inert material. Use of the inert material with the catalyst composition provides for better dispersion of the hydrocarbon containing feed stream. Also, other catalysts such as known hydrogenation and desulfurization catalysts (e.g., $NiO/MoO_3$, $CoO/MoO_3$ or $NiO/CoO/MoO_3$ on alumina) may be used with the catalyst composition of this invention to achieve simultaneous demetallization, desulfurization, denitrogenation, hydrogenation and hydrocracking, if desired. In one embodiment of said hydrocarbon hydrotreating process, the catalyst composition of this invention has been presulfided as described above before being used.

Any suitable reaction time between the catalyst composition and the hydrocarbon containing feed stream and hydrogen gas can be utilized. In general, the reaction time will range from about 0.05 hours to about 10 hours. Preferably, the reaction time will range from about 0.4 to about 5 hours. Thus, the flow rate of the hydrocarbon containing feed stream should be such that the time required for the passage of the mixture through the reactor (residence time) will preferably be in the range of about 0.4 to about 5 hours. In a continuous fixed bed operation, this generally requires a liquid hourly space velocity (LHSV) in the range of about 0.10 to about 20 cc of feed per cc of catalyst per hour, preferably from about 0.2 to about 2.5 cc/cc/hr.

The hydrotreating process employing the catalyst composition of the present invention can be carried out at any suitable temperature. The reaction temperature will generally be in the range of about 250° C. to about 550° C. and will preferably be in the range of about 350° C. to about 450° C. Higher temperatures do improve the removal of metals, but temperatures which will have adverse effects on the hydrocarbon containing feed stream, such as excessive coking, will usually be avoided. Also, economic considerations will usually be taken into account in selecting the operating temperature. Lower temperatures can generally be used for lighter feeds.

Any suitable pressure may be utilized in the hydrotreating process. The reaction pressure will generally be in the range of about atmospheric pressure (0 psig) to up to about 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen gas can be added to the hydrotreating process. The quantity of hydrogen gas used to contact the hydrocarbon containing feed stock will generally be in the range of about 100 to about 10,000 standard cubic feet $H_2$ per barrel of the hydrocarbon containing feed stream and will more preferably be in the range of about 1000 to about 6000 standard cubic feet $H_2$ per barrel of the hydrocarbon containing feed stream.

In general, the catalyst composition is utilized primarily for demetallization until a satisfactory level of metals removal is no longer achieved which generally results from the coating of the catalyst composition with coke and metals being removed from the feed. It is possible to remove the metals from the catalyst composition. But these procedures are expensive, and it is generally contemplated that once the removal of metals falls below a desired level, the spent (deactivated) catalyst will simply be replaced by a fresh catalyst.

The time in which the catalyst composition of this invention will maintain its activity for removal of metals and sulfur will depend upon the metals concentration in the hydrocarbon containing feed streams being treated. Generally the catalyst composition can be used for a period of time long enough to accumulate about 20–200 wt. % of metals, mostly Ni and V, based on the initial weight of the catalyst composition, from the hydrocarbon containing feed. In other words, the weight of the spent catalyst composition will be about 20–200% higher than the weight of the fresh catalyst composition.

Generally, at least a portion of the hydrotreated product stream having reduced metal and sulfur contents is subsequently cracked in a cracking reactor, e.g. in a fluidized catalytic cracking unit, under such conditions as to produce lower boiling hydrocarbon materials suitable for use as gasoline, diesel fuel, lubricating oils and other useful products. It is within the scope of this invention to hydrotreat said product stream having reduced metal and sulfur contents in one or more processes using different catalyst compositions, such as commercial alumina-supported $NiO/MoO_3$ catalysts, for further removal of sulfur and other impurities, before the product stream is introduced into the cracking reactor.

A further embodiment of this invention is a hydrofining process comprising the step of introducing at least one decomposable metal compound into the hydrocarbon containing feed stream prior to its being contacted with the $Ni/V/Al_2O_3$-containing catalyst composition of this invention. The metal in the decomposable metal compound is selected from the group consisting of the metals of Group IV-B, Group V-B, Group VI-B, Group VII-B, Group VIII and IB of the Periodic Table (as defined in "College Chemistry" by Nebergall et al; D. C. Heath and Company, 1972). Preferred metals are molybdenum, tungsten, manganese, chromium, zirconium and copper. Molybdenum is a particularly preferred metal which may be introduced as a carbonyl, acetate, acetylacetonate, carboxylate (e.g., octoate), naphthenate, mercaptides, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon containing feed, which also contains metals such as nickel and vanadium. These additives can be added continuously or intermittently and are preferably added at a time when the catalyst composition of this invention has been partially deactivated so as to extend its life.

Any suitable concentration of the additive may be added to the hydrocarbon containing feed stream. In general, a sufficient quantity of the additive will be added to the hydrocarbon containing feed stream to result in a concentration of the metal (preferably molybdenum) of said decomposable compounds ranging from about 1 to about 1000 parts per million by weight and more preferably in the range of about 5 to about 100 parts per million in said feed stream.

The following examples are presented in further illustration of the invention and are not to be considered as unduly limiting the scope of this invention.

EXAMPLE I

This example illustrates the preparation of several supported, nickel and vanadium containing hydrofining catalyst compositions.

Catalyst A (Invention):

11.7 grams of $NH_4VO_3$ and 11.8 grams of $NiCO_3$ were mixed with 80 mL of a concentrated aqueous ammonia solution in a 250 mL Erlenmeyer flask. The mixture was stirred for 15 minutes and was slowly (over a period of 15 minutes) diluted with distilled water to a total volume of ~150 mL. The total weight of the contents of the flask was about 166 grams. Most of the solution was decanted; the rest was filtered. A small amount (about 0.1 gram) of an insoluble solid was discarded. The solution contained about 0.1 mole of vanadium and 0.1 mole of nickel.

2 mL of concentrated aqueous ammonia was diluted with 15 mL of distilled water. Then 3.71 grams of the above-described Ni/V-containing solution was added to the dilute ammonia solution. This mixture was diluted with distilled water to a total volume of 24 mL and then mixed with 26.0 grams of alumina (provided by American Cyanamid Company, Wayne, NJ under the designation SN 5982; BET/$N_2$ surface area: 171 $m^2/g$; mercury pore volume: 0.94 cc/g). The total mixture was air-dried at room temperature for about 1 hour and then dried/calcined in a furnace as follows: 100° F.→400° F. within 30 minutes; 2 hours at 400° F.; 400° F.→500° F. within 30 minutes; 1 hour at 500° F.; 500° F.→800° F. within 30 minutes; 3 hours at 800° F.; 800° F.→room temperature within about 2 hours. The calcined catalyst Composition A contained 0.43 weight-% V and 0.50 weight-% Ni.

Catalyst B (Control):

This catalyst was prepared by sequential impregnation of alumina with vanadium and nickel. 0.26 gram of $NH_4VO_3$ was dissolved in 24 mL of dilute aqueous ammonia. This solution was mixed with 26.0 of SN 5982 alumina, and the wet mixture was air-dried in open dish at room temperature for about one hour and then dried/calcined in accordance with the procedure described for Catalyst A. Thereafter, 0.65 gram of $Ni(NO_3)_2 \cdot 6H_2O$ was dissolved in enough water to make 24 mL of an aqueous solution, which was mixed with the calcined vanadium-impregnated alumina. The above-described drying/calcining was repeated for the Ni/V-impregnated alumina. The calcined Catalyst B contained 0.43 weight-% V and 0.50 weight-% Ni.

Catalyst C (Control):

This catalyst was prepared by simultaneous impregnation of alumina with an aqueous Ni—V solution, in the absence of ammonia and carbonate ions. 1.20 grams of $Ni(NO_3)_2 \cdot 6H_2O$ and 0.82 gram of $VOSO_4 \cdot 2H_2O$ were dissolved in enough distilled water to make a solution of 22 mL, which was then thoroughly mixed with 24.0 g of SN 5982 alumina. The thus impregnated alumina was air-dried in an open dish at room temperature for several hours, and was then dried/calcined in accordance with the procedure described for Catalyst A. The calcined Catalyst C contained 0.85 weight-% V and 0.98 weight-% Ni (thus twice as much V and Ni as Catalyst A).

EXAMPLE II

In this example, the automated experimental setup for investigating the hydrofining of heavy oils in accordance with the present invention is described. Oil was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 40 cc of low surface area α-alumina (14 grit Alundum; surface area less than 1 $m^2/gram$), a middle layer of a mixture of 50 cc of hydrofining catalyst A, B, or C and 70 cc of 36 grit Alundum, and a bottom layer of about 30 cc of α-alumina.

The oil feed was a Maya 400F+ residuum containing about 4.0 weight-% sulfur, about 62 ppmw (parts per million by weight) nickel, about 302 ppmw vanadium, about 12.7 weight-% Ramsbottom carbon residue, about 0.44 weight-% nitrogen, and having an API$^{60}$ gravity of 14.1.

Hydrogen was introduced into the reactor through a tube that concentrically surrounded the oil induction tube but extended only to the reactor top. The reactor was heated with a 3-zone furnace. The reactor temperature was measured in the catalyst bed at three different locations by three separate thermocouples embedded in an axial thermocouple well. The liquid product oil was generally collected every day for analysis. Excess hydrogen gas vented. The concentrations of vanadium and nickel in the oil were determined by plasma emission analysis; sulfur content was measured by X-ray fluorescence spectrometry; Ramsbottom carbon residue was determined in accordance with ASTM D524; and N content was measured in accordance with ASTM D3228.

EXAMPLE III

This example illustrates the removal of metals and sulfur from a heavy feed (Maya 400F+) by hydrotreatment in the presence of Catalysts A, B and C. Pertinent process conditions and test results are summarized in Table I. Only truly comparable run samples obtained at LHSV (cc feed per hour per cc catalyst) values ranging from 0.9 to 1.1 and after at least 2 days on stream are listed.

TABLE I

| Run | Catalyst | Hours on Stream | Temp. (°F.) | Flow Rate (LHSV) | %-Removal of S | %-Removal of (Ni + V) | Wt-% Metal Loading on Catalyst |
|---|---|---|---|---|---|---|---|
| 1 (Invention) | A | 107 | 750 | 1.02 | 23.1 | 60.3 | 4.9 |
|  |  | 136 | 750 | 1.00 | 17.4 | 64.8 | 6.3 |
|  |  | 160 | 750 | 0.94 | 26.3 | 66.6 | 7.5 |
|  |  | 210 | 750 | 1.03 | 34.0 | 66.3 | 10.0 |
|  |  | 274 | 750 | 0.98 | 37.2 | 69.1 | 13.2 |
|  |  | 301 | 750 | 0.98 | 37.7 | 71.2 | 14.7 |
|  |  | 328 | 750 | 0.98 | 35.7 | 70.9 | 16.1 |
|  |  | 356 | 750 | 0.92 | 40.5 | 73.4 | 17.5 |
|  |  | 384 | 750 | 1.04 | 42.7 | 70.6 | 19.1 |
| 2 (Control) | B | 88 | 750 | 0.96 | 25.2 | 57.1 | 3.4 |
|  |  | 113 | 750 | 0.99 | 21.1 | 58.2 | 4.5 |
|  |  | 138 | 750 | 0.99 | 27.5 | 61.7 | 5.7 |
|  |  | 163 | 750 | 0.93 | 33.8 | 64.0 | 6.8 |
|  |  | 240 | 750 | 0.98 | 35.0 | 68.7 | 10.6 |

TABLE I-continued

| Run | Catalyst | Hours on Stream | Temp. (°F.) | Flow Rate (LHSV) | %-Removal of S | %-Removal of (Ni + V) | Wt-% Metal Loading on Catalyst |
|---|---|---|---|---|---|---|---|
|   |   | 294 | 750 | 1.04 | 35.52 | 67.4 | 13.3 |
|   |   | 322 | 750 | 1.00 | 39.2 | 68.8 | 14.8 |
|   |   | 350 | 750 | 0.99 | 43.9 | 70.0 | 16.3 |
|   |   | 377 | 750 | 0.95 | 40.4 | 70.0 | 17.6 |
| 3 (Control) | C | 48 | 750 | 1.00 | —[1] | 55.1 | 1.8 |
|   |   | 72 | 750 | 0.93 | —[1] | 57.7 | 2.7 |
|   |   | 96 | 750 | 1.10 | —[1] | 55.7 | 3.7 |
|   |   | 120 | 750 | 0.99 | —[1] | 62.1 | 4.8 |
|   |   | 192 | 750 | 1.08 | 21.8 | 65.9 | 9.3 |
|   |   | 216 | 750 | 1.05 | 22.4 | 65.5 | 10.5 |
|   |   | 240 | 750 | 0.98 | 22.7 | 68.0 | 11.6 |
|   |   | 288 | 750 | 1.02 | 34.2 | 70.4 | 14.6 |

[1]Measured data were erroneous.

Data in Table I show that at run times up to about 10 days (240 hours) the removal of nickel and vanadium was higher for invention run 1 using Catalyst A (prepared by the one-step impregnation process of this invention) than for control run 2 (using Catalyst B prepared by a two-step impregnation process) and for control run 3 (using Catalyst C prepared by a different one-step impregnation process and containing twice as much V and Ni than invention Catalyst A). After a period of about 10 days, initial differences in catalyst activity were apparently obscured by the increases in demetallization activity due to the deposition of nickel and vanadium compounds contained in the oil onto the catalysts.

EXAMPLE IV

This example illustrates the effect of the addition of small amounts of a decomposable molybdenum compound, $Mo(CO)_6$, to an undiluted Monagas pipeline oil feed containing about 336 ppm V and about 87 ppm Ni on the removal of these metals in the presence of a commercial hydrofining catalyst containing about 0.9 weight-% CoO, 0.5 weight-% NiO, 7.3 weight-% $MoO$ and about 91 weight $Al_2O_3$, having a surface area of about 180 $m^2/g$). LHSV of the feed for both runs ranged from about 1.0 to 1.1 cc/cc catalyst/hr, the temperature was about 765° C. (407° C.), the pressure was about 2250 psig, and the hydrogen feed rate was about 4800 SCF/barrel oil. Experimental data are summarized in Table II.

TABLE II

| Days on Stream | PPM Mo in Feed | %-Removal of (Ni + V) | PPM Mo in Feed | %-Removal % (Ni + V) |
|---|---|---|---|---|
| 5 | 0 | 64 | 17 | 72 |
| 12–13 | 0 | 62 | 17 | 71 |
| 17 | 0 | 59 | 7 | 70 |
| 20–21 | 0 | 61 | 7 | 65 |
| 26 | 0 | 58 | 7 | 64 |
| 32–33 | 0 | 53 | 7 | 65 |
| 41 | 0 | 52 | 7 | 70 |
| 52–53 | 0 | 41 | 7 | 66 |
| 58–59 | 0 | 43 | 4 | 65 |

Data in Table II clearly show the beneficial effect of added small amounts of Mo (as $Mo(CO)_6$) to the feed on the demetallization of the oil when a commercial hydrofining catalyst was used. Based on these results, it is presently preferred to introduce a decomposable compound such as $Mo(CO)_6$ into the feed that is hydrotreated with the catalyst composition of this invention.

Reasonable variations and modifications are possible within the scope of the disclosure and the appended claims.

We claim:

1. A process for preparing a composition of matter comprising the steps of:
   (A) mixing (a) at least one vanadium and oxygen containing compound, (b) at least one nickel (II) compound, (c) ammonia, and (d) water, in such amounts and under such conditions as to obtain a solution;
   (B) mixing the solution obtained in step (A) with an alumina-containing support material;
   (C) heating the mixture obtained in step (B) at a first temperature under such conditions as to at least partially dry said mixture; and
   (D) heating the at least partially dried mixture obtained in step (C) at a second temperature, which is higher than said first temperature, under such conditions as to activate said mixture.

2. A process in accordance with claim 1, wherein said vanadium and oxygen containing compound (a) is selected from the group consisting of ammonium and alkali metal orthovanadates, ammonium and alkali metal pyrovanadates, ammonium and alkali metal metavanadates, divanadium pentoxide and hydrated forms thereof, vanadium dioxide and hydrated forms thereof, divanadium trioxide and hydrated forms thereof; and said nickel (II) compound (b) is selected from the group consisting of nickel carbonate, nickel bicarbonate, basic nickel carbonate, nickel nitrate, nickel sulfate, nickel halides, nickel acetate, nickel formate, nickel oxalate, nickel carboxylates containing from 3–12 carbon atoms, nickel oxide and nickel hydroxide.

3. A process in accordance with claim 1, wherein said solution obtained in step (A) comprises about 0.005–4.0 mole/l V, about 0.005–4.0 mole/l Ni and about 0.03–10 mole/l $NH_3$.

4. A process in accordance with claim 1, wherein said vanadium and oxygen containing compound is $NH_4VO_3$, and said nickel (II) compound is $NiCO_3$.

5. A process in accordance with claim 4, wherein said solution obtained in step (A) comprises about 0.01–1.5 mole/l V, 0.01–1.5 mole/l Ni and 0.1–6 mole/l $NH_3$.

6. A process in accordance with claim 1, wherein said heating conditions in step (C) comprise a temperature ranging from about 25° C. to about 200° C. and said heating in step (D) is carried out at a temperature ranging from about 200° C. to about 600° C.

7. A process in accordance with claim 1, wherein said alumina-containing support has a surface area ranging from about 20 m$^2$/g to about 350 m$^2$/g.

8. A composition of matter, suitable as a catalyst composition, having been prepared by a process comprising the steps of:
   (A) mixing (a) at least one vanadium and oxygen containing compound, (b) at least one nickel (II) compound, (c) ammonia and (d) water, in such amounts and under such conditions as to obtain a solution;
   (B) mixing said solution obtained in step (A) with an alumina-containing support material;
   (C) heating the mixture obtained in step (B) at a first temperature under such conditions as to at least partially dry said mixture; and
   (D) heating the at least partially dried mixture obtained in step (C) at a second temperature, which is higher than said first temperature, under such conditions as to activate said mixture.

9. A composition of matter in accordance with claim 8, wherein said vanadium and oxygen containing compound (a) is selected from the group consisting of ammonium and alkali metal orthovanadates, ammonium and alkali metal pyrovanadates, ammonium and alkali metal metavanadates, divanadium pentoxide and hydrated forms thereof, vanadium dioxide and hydrated forms thereof, divanadium trioxide and hydrated forms thereof; and said nickel (II) compound is selected from the group consisting of nickel carbonate, nickel bicarbonate, basic nickel carbonate, nickel nitrate, nickel sulfate, nickel halides, nickel acetate, nickel formate, nickel oxalate, nickel carboxylates containing from 3–12 carbon atoms, nickel oxide and nickel hydroxide.

10. A composition of matter in accordance with claim 8, said solution obtained in step (A) comprises about 0.005–4.0 mole/l V, about 0.005–4.0 mole/l Ni, and about 0.03–10 mole/l NH$_3$.

11. A composition of matter in accordance with claim 9, wherein said vanadium and oxygen containing compound in NH$_4$VO$_3$, and said nickel (II) compound is NiCO$_3$.

12. A composition of matter in accordance with claim 8, wherein said heating conditions in step (C) comprise a temperature ranging from about 25° C. to about 200° C. and said heating in step (D) is carried out at a temperature ranging from about 200° C. to about 600° C.

13. A composition of matter in accordance with claim 8 comprising from about 0.1 to about 5.0 weight-% V, based on the weight of the entire catalyst composition; from about 0.1 to about 5.0 weight-% Ni, based on the weight of the entire catalyst composition; and having a surface area ranging from about 20 m$^2$/g to about 350 m$^2$/g.

14. A composition of matter in accordance with claim 8 comprising from about 0.5 to about 2.0 weight-% V, based on the entire catalyst composition; from about 0.5 to about 2.0 weight-% Ni, based on the entire catalyst composition; and having a surface area ranging from about 100 m$^2$/g to about 250 m$^2$/g.

* * * * *